United States Patent
Dover et al.

[11] Patent Number: 5,937,985
[45] Date of Patent: Aug. 17, 1999

[54] RETAINING RING IN A HYDRAULICALLY ACTUATED FRICTION ELEMENT ASSEMBLY FOR AN AUTOMATIC TRANSMISSION

[75] Inventors: Harry Dover, Dearborn; Susan Anne Fedorka, Novi, both of Mich.

[73] Assignee: Ford Motor Company, Dearborn, Mich.

[21] Appl. No.: 08/905,611

[22] Filed: Aug. 4, 1997

[51] Int. Cl.$^6$ .............................. F16B 21/18; F16D 13/52
[52] U.S. Cl. .............. 192/70.2; 192/109 R; 192/85 AA; 403/DIG. 7
[58] Field of Search ................................ 192/10.2, 70.19, 192/109 R, 109 B, 109 A, 85 AA; 403/DIG. 7; 411/517, 518, 519

[56] References Cited

U.S. PATENT DOCUMENTS

| | | | |
|---|---|---|---|
| 3,313,385 | 4/1967 | Forster | 192/70.2 |
| 3,460,427 | 8/1969 | Baumgarten | 411/518 |
| 4,014,619 | 3/1977 | Good et al. | 192/70.2 X |
| 4,714,146 | 12/1987 | Moroto et al. | 192/85 AA |
| 4,813,522 | 3/1989 | Fujioka et al. | 192/70.2 |
| 4,997,073 | 3/1991 | Fujioka et al. | 192/70.2 |
| 5,103,953 | 4/1992 | Nakayama et al. | 192/85 AA |
| 5,352,079 | 10/1994 | Croskey | 411/518 |
| 5,617,941 | 4/1997 | Takahashi et al. | 192/70.2 X |

OTHER PUBLICATIONS

U. application No. 08/852,549–A Friction Gear Assembly For Driving A Power Takeoff Unit From An Automatic Transmission, Filed May 7, 1997.

*Primary Examiner*—Charles A Marmor
*Assistant Examiner*—Ankur Parekh
*Attorney, Agent, or Firm*—Frank G. McKenzie

[57] ABSTRACT

In a hydraulically actuated friction clutch or brake for an automatic transmission, contact between a pressure plate and retaining ring, each drivably engaged with an axially spline, is located at radialy outer position on the retaining ring, either because the adjacent surface of the pressure plate is relieved to produce contact at that location or because the retaining ring has a lateral surface that is relieved locally or tapered away from the surface of the retaining ring. Bending through the thickness of the component in which the spline teeth engage the pressure plate and retaining ring is reduced because the reaction force is applied to that component closer to the neutral axis than if contact between the pressure plate and retaining ring were distributed over a greater radial dimension of the retaining ring.

2 Claims, 2 Drawing Sheets

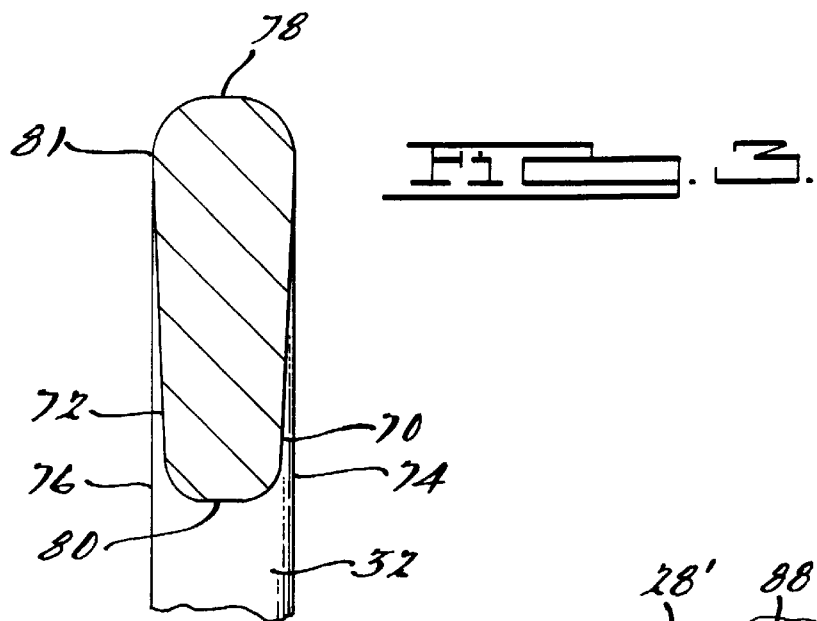
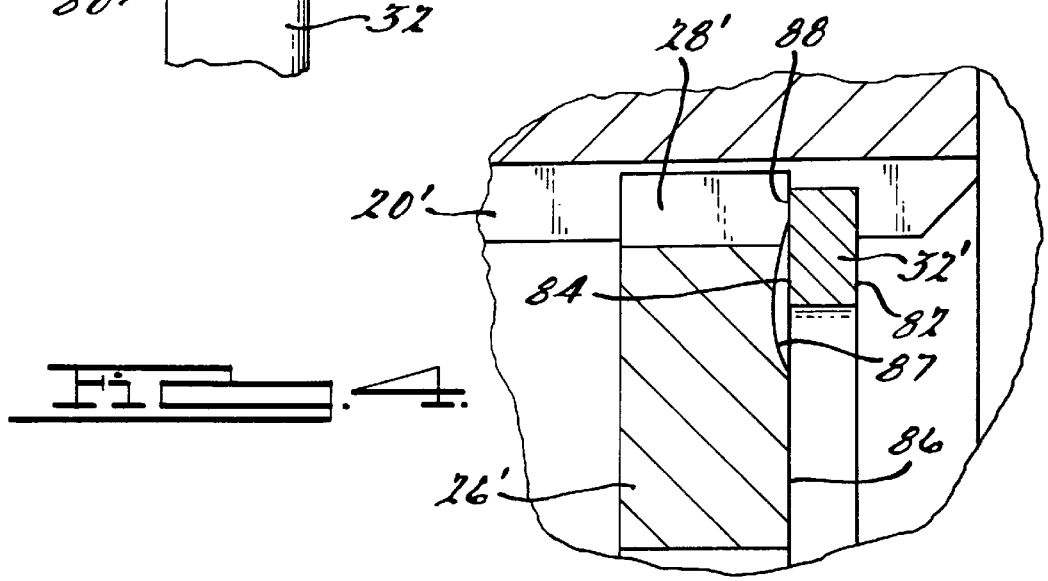
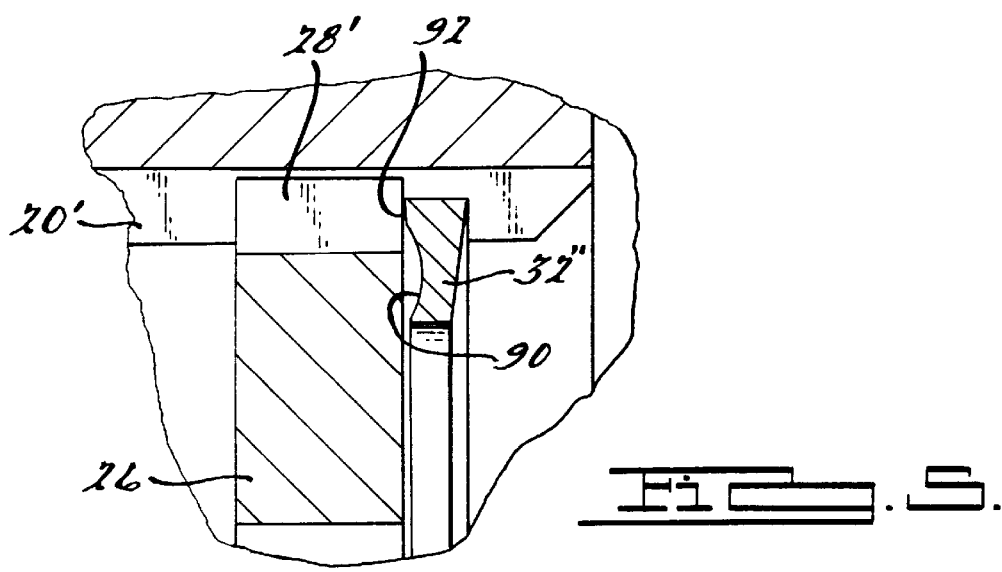

| # RETAINING RING IN A HYDRAULICALLY ACTUATED FRICTION ELEMENT ASSEMBLY FOR AN AUTOMATIC TRANSMISSION

BACKGROUND OF THE INVENTION

1. Field of the Invention

This invention pertains to a hydraulically actuated friction clutch or brake for use in the kinematic arrangement of an automatic transmission.

2. Description of the Prior Art

In a hydraulically actuated friction clutch or friction brake of the type used in the kinematic arrangement of an automatic transmission, the hydraulic force applied by a piston to the friction disc, spacer plates and pressure plate is reacted during engagement of the friction element conventionally by a retention ring seated within a recess formed in the wall of a member, such as a hydraulic cylinder. The internal surface of the reacting member is formed with axially directed spline teeth driveably engaged by the pressure plate friction discs and spacer plates.

In a conventional arrangement of this type, the pressure plate contacts the retaining ring with a pressure that is distributed along the annular adjacent surface of the retaining ring and across the radial depth or width of the retaining ring. Because the force applied to the retaining ring is distributed over a surface and not concentrated radially along a line, an eccentricity between the application of the force and its reaction on the member produces an annularly distributed axial force and an annularly distributed bending moment through the thickness of the reacting member. The retaining ring and the recess in which it is fitted are located near the free end of the reacting member. This location of the bending moment near a free end of the reaction member increases the magnitude of bending stress developed in the member in comparison to the magnitude of bending stress that would result if the bending moment were applied more distant from the free end. Furthermore, the bending moment produces tension stress on the inner surface of the reacting member, which adds to the tension stress produced in the reacting member by the axial reaction force. The combination of the bending moment applied near the free end of the reacting member and the tension force developed in reaction to the application of hydraulic pressure applied by the piston can combine to produce premature failure of the reacting member.

SUMMARY OF THE INVENTION

In order to avoid these difficulties, it is preferable that the force applied to the friction disc pack by the hydraulic force that engages the clutch be located at a maximum radial position, preferably close to the neutral axis of the member on which the hydraulic force is reacted, and that the magnitude of the bending moment be minimized.

In realizing these objects and advantages, in a hydraulically actuated friction element for an automatic transmission, an assembly according to the present invention includes a first member having axially directed spline teeth, an annular recess located adjacent the spline teeth; discs driveably engaged with the spline teeth and moveable axially along the spline toward the recess; and a retaining ring located in the recess, extending radially, located adjacent a disc, having a first surface located at a radially outer lateral position for contact with said adjacent disc, a space being provided between the retaining ring and said adjacent disc along a radial length of the retaining ring extending radially inward from said first surface, whereby contact of said adjacent disc and retaining ring occurs at said first surface.

BRIEF DESCRIPTION OF THE DRAWINGS

FIG. 3 is a side view of the retaining ring of FIG. 2.

FIG. 4 is a cross section of the area occupied by a retaining ring and disc or pressure plate of the friction element pack.

FIG. 5 is a cross section of an area similar to that of FIG. 4 showing an alternate form of the disc and retaining ring.

DESCRIPTION OF THE PREFERRED EMBODIMENT

Figure 1:
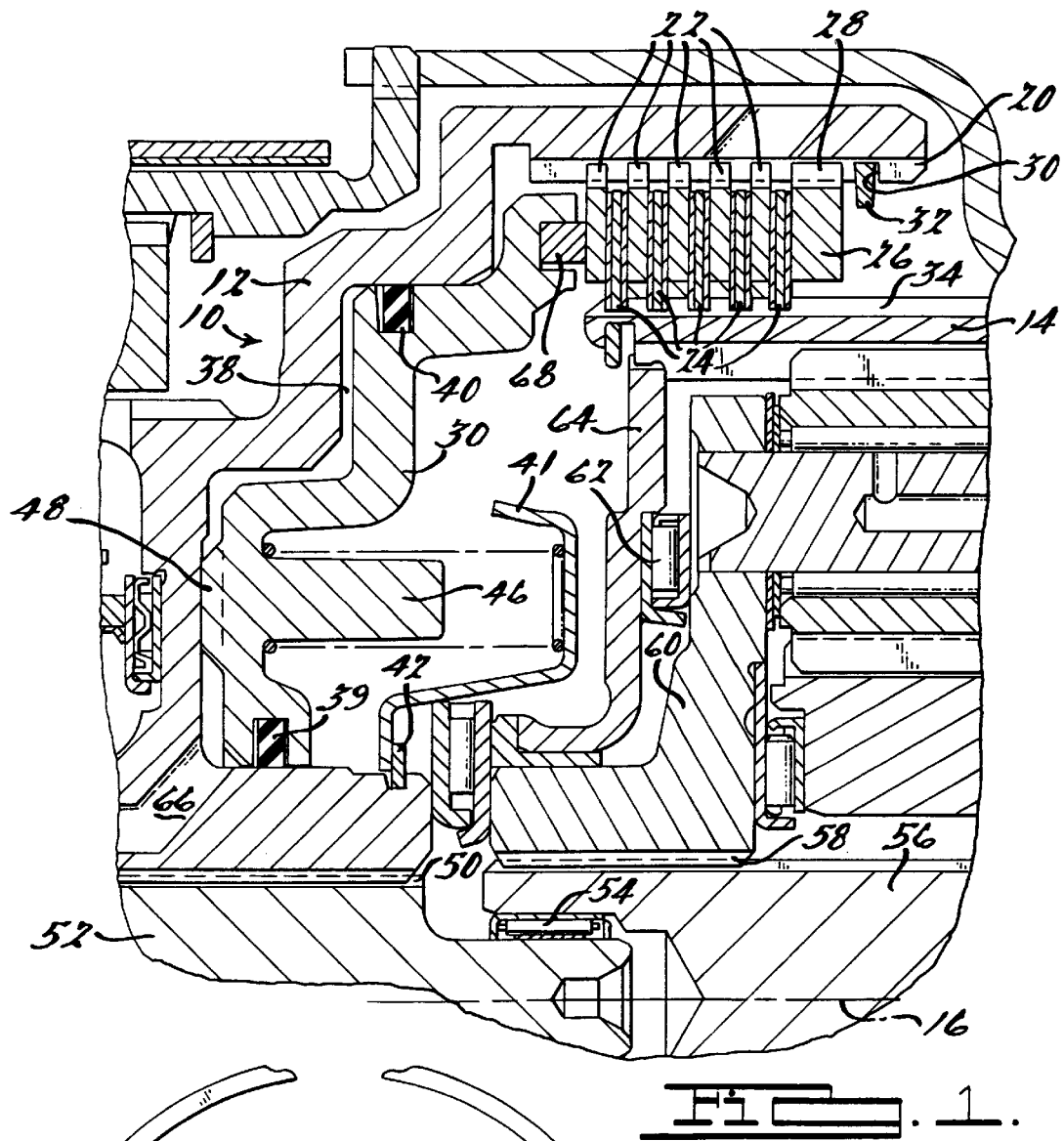
FIG. 1 is a cross section of a portion of an automatic transmission in the vicinity of a hydraulically actuated friction clutch according to the present invention.

Referring first to FIG. 1, a clutch assembly 10 is adapted to produce a drive connection between a first component 12, such as a hydraulic cylinder, and a second component 14, such as a ring gear, of a planetary gear unit in the kinematic arrangement of an automatic transmission. The clutch assembly is arranged substantially symmetrically about a longitudinal axis 16.

The inner surface of cylinder 12 is formed with axially directed spline teeth 20 engaged driveably with spline teeth formed on the outer surface of a first set of spacer plates 22, which are each mutually spaced axially to provide an intervening space between them, within which is located a friction disc 24 of a second set of discs that comprise the clutch pack. Friction discs 24 have friction paper applied to each of their axially faces, which are engaged by the adjacent face of the spacer plates. Located at one axial end of the clutch pack is a pressure plate 26 having spline teeth 28 formed on its outer surface and continually drivably engaged with spline teeth 20 of cylinder 12.

An annular recess 30 is formed on the inner surface of cylinder 12. A retaining ring 32 is located within recess 30 such that the radially outer surface of the retaining ring contacts the base of the recess with a resilient interference fit.

The friction discs 24 are formed with spline teeth located at their radialy inner surface, the splines being adapted to drivably engaged spline teeth 34 formed on the outer surface of ring gear 14.

A piston 36 located in cylinder 12 for axially displacement, moves in responses to pressurized hydraulic fluid supplied to a space 38 located between the piston face and the inner surface of cylinder 12. Seals 39,40 located in recesses formed on piston 36, are adapted to prevent passage of hydraulic fluid from within the cylinder space 38.

A spring retainer 41 is secured to the cylinder by a snap ring 42, located in a recess formed on the inner surface of the cylinder. A helical compression return spring 44, guided on a stud 46 protruding from the inner surface of piston 30, contacts both retainer 40 and the piston as the piston moves rightward within the cylinder. Spring 44 compress and develops a force tending to return piston 30 to the position shown in FIG. 1 where its leftward movement is stopped due to contact between the inner surface of cylinder 12 and a boss 48 formed on the adjacent surface of the piston.

Cylinder 12 is driveably connected by a spline 50 to an intermediate shaft 52, which is rotatably supported by a bearing 54, located in a pocket provided at the end of an output shaft 56, splined at 58 to the carrier 60 of the planetary gear unit of which the ring gear 14 is a part. A needle bearing 62 facilitates relative rotation between carrier 60 and a member 64, which supports ring gear 14.

In operation, pressurized hydraulic fluid, supplied through passage 66 formed in cylinder 12, from a source of control pressure forces piston 30 to move rightward against the effect of spring 44, thereby forcing a rubber apply ring 68 into contact with a first spacer plate 22 until ring 68 compresses sufficiently to bring the end face of piston 30 into contact with that spacer plate. This action causes the entire clutch pack to move rightward, thereby bringing pressure plate 26 into contact with retaining ring 32, which prevents further axially displacement of the clutch pack axially due to its seated condition within recess 30. With the clutch pack so disposed, further increase in hydraulic pressure within space 38 forces the friction discs 24 and spacer plates 22 into increased frictional contact until the maximum torque capacity of the clutch 10 is reached. In this way a frictional drive connection is completed between cylinder 12 and ring gear 14.

When the space 38 within cylinder 12 is vented, piston 30 moves leftward toward the position showed in FIG. 1 due to the effect of compression spring 44 and the effect of hydraulic pressure confined within the spaces between friction discs 24 and spacer plates 22. When the pressure in space 38 is reduced, hydraulic pressure between the spacer plates and friction plates separates them mutually and reduces the torque capacity of the clutch to substantially zero.

Figure 2:
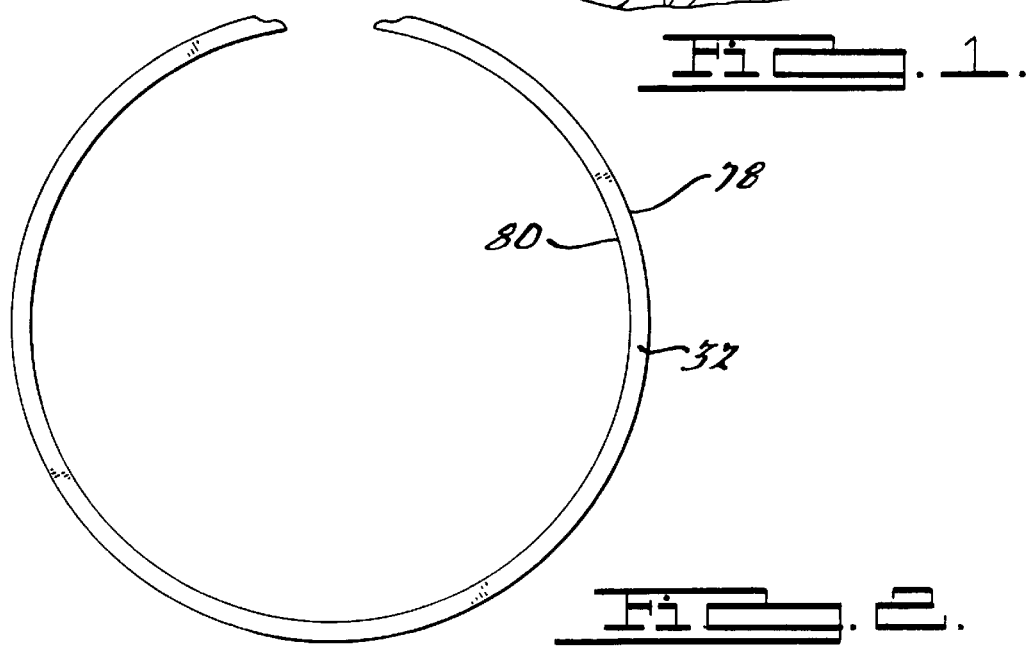
FIG. 2 is a front view of a retaining ring for the clutch of FIG. 1.

Referring now to FIG. 2, retaining ring 32, which is formed of spring steel such as SAE1070 steel or British material WSD-MIA82-B is annular in form, but has a slot forming a circumferential discontinuity. In its free form, the outside diameter is slightly larger than the outside diameter at the base of recess 30 so that in the installed condition the retaining ring is fitted within the slot with a slight interference fit.

FIG. 3 shows a cross section of one form of retention ring 32, in which the lateral surfaces 70,72 are inclined with a respect to radial lines 74,76, respectively. The radially outer surface 78, terminate at fillet radii having the dimensions 0.6+0.1−0.0 mm. The inner radial surface 80 terminates at fillet radii having the dimension 0.4 mm max. The radial distance between surfaces 78 and 80 is 4+0.0−0.1 mm. A maximum axial width of one form of the retaining ring is 2.44+0.0−0.1 mm, and an acceptable narrower axially width may have the dimensions 1.37+0.0−0.1 mm. The free dimension of the retaining ring across the diameter shown in FIG. 2 is 142.5+0−1.8 mm.

Preferably, ring 32 contacts pressure plate 26 at a first surface 81, located at or adjacent the arcuate line through the point of tangency where the fillet radius meets lateral surface 72.

FIG. 4 shows an alternative arrangement in which a pressure plate 26' whose external spline teeth 28' are drivably engaged with internal spline teeth 20', moves rightward axially along the axis of the spline into contact with a retaining ring 32'. In this case, the retaining ring has substantially radially directed parallel lateral surfaces 82,84. The adjacent face 86 of the pressure plate is formed with a concave surface 87 so that the retaining ring contacts the pressure plate only at a radialy outer location 88 rather than along the entire surface 84.

FIG. 5 shows an alternative form of the invention in which the lateral face of the retaining ring 32', adjacent pressure plate 26, but instead is inclined and is relieved by a concave depression 90. The adjacent lateral surface of the pressure plate 26" is substantially radially planar. In this case, contact between the pressure plate 26 and retaining ring 32" occurs at a radially outer position 92.

The retaining ring 32 is available commercially from Peterson Spring, 800 West Broadway, Three Rivers Mich., 49093, and from Hugo Benzing GmbH and Co. KG, Daimlerstrasse 49-53, 70825 Korntal, Munchingen, Germany.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. In a hydraulically actuated friction element for an automatic transmission, an assembly comprising:

a first member having axially directed spline teeth, an annular recess located adjacent the spline teeth;

a disc driveably engaged with the spline teeth and moveable axially along the spline teeth toward the recess; and a retaining ring located in the recess, extending radially, located adjacent the disc, having a first surface located at a radially outer lateral position for contact with said disc, said ring having an inner surface, a slot that interrupts arcuate continuity of the ring, and a lateral surface facing the disc and extending between the first surface and inner surface, said lateral surface being inclined radially inward from the first surface and axially away from the disc, said lateral surface having a concave depression located radially inward from the first surface, whereby contact of said disc and retaining ring occurs at said first surface and said retaining ring is elastically retained in the recess.

2. In a hydraulically actuated friction element for an automatic transmission, an assembly comprising:

a hydraulic cylinder;

a piston located in the cylinder for displacement;

a first member having axially directed spline teeth, an annular recess located adjacent the spline teeth;

a friction pack located adjacent the cylinder including a first set of friction discs spaced mutually, a second set of friction discs, a member of the second set located between successive members of the first set, and a pressure plate located at an axial end of the friction pack, the first set, second set and pressure plate driveably engaged with the spline teeth and moveable axially along the spline teeth toward the recess;

a retaining ring located in the recess, extending radially, located adjacent the pressure plate, having a first surface located at a radially outer lateral position for contact with said pressure plate, and ring having an inner surface, a slot that interrupts accurate continuity of the ring, and a lateral surface facing the disc and extending between the first surface and inner surface, said lateral surface being inclined radially inward from the first surface and axially away from the disc, said lateral surface having a concave depression located radially inward from the first surface, whereby contact of said pressure plate and retaining ring occurs at said first surface and said retaining ring is elastically retained in the recess.

\* \* \* \* \*